(12) United States Patent
Sotta et al.

(10) Patent No.: US 11,067,489 B2
(45) Date of Patent: Jul. 20, 2021

(54) DEVICE FOR MEASURING RUBBER WEAR

(71) Applicants: RHODIA OPERATIONS, Paris (FR); CENTRE NATIONAL DE LA RECHERCHE SCIENTIFIQUE, Paris (FR)

(72) Inventors: Paul Sotta, Lyons (FR); Matthieu Guibert, Lyons (FR); Jean-Luc Loubet, Frontenas (FR); Jean Thevenet, Chirens (FR); Loïc Vanel, Lyons (FR); Menglong Huang, Lyons (FR)

(73) Assignees: RHODIA OPERATIONS, Aubervilliers (FR); Centre National de la Recherche Scientifique, Paris (FR)

( * ) Notice: Subject to any disclaimer, the term of this patent is extended or adjusted under 35 U.S.C. 154(b) by 183 days.

(21) Appl. No.: 16/333,216

(22) PCT Filed: Sep. 7, 2017

(86) PCT No.: PCT/EP2017/072440
§ 371 (c)(1),
(2) Date: Mar. 13, 2019

(87) PCT Pub. No.: WO2018/050531
PCT Pub. Date: Mar. 22, 2018

(65) Prior Publication Data
US 2019/0242800 A1    Aug. 8, 2019

(30) Foreign Application Priority Data
Sep. 14, 2016 (EP) .................................. 16306165

(51) Int. Cl.
*G01N 3/56* (2006.01)
*G01N 3/06* (2006.01)
(Continued)

(52) U.S. Cl.
CPC ............... *G01N 3/56* (2013.01); *G01N 3/066* (2013.01); *G01N 3/068* (2013.01); *G01N 3/34* (2013.01); *G01N 3/62* (2013.01); *G01N 19/02* (2013.01)

(58) Field of Classification Search
CPC .......... G01N 3/56; G01N 3/066; G01N 19/02; G01N 3/068; G01N 3/34; G01N 3/62
(Continued)

(56) References Cited

U.S. PATENT DOCUMENTS

| 4,966,030 | A | 10/1990 | Kobayashi |
| 6,349,587 | B1 * | 2/2002 | Mani ..................... G01N 19/02 73/9 |

(Continued)

FOREIGN PATENT DOCUMENTS

| WO | 0161315 A1 | 8/2001 |
| WO | 2012006613 A2 | 1/2012 |

OTHER PUBLICATIONS

Z. Mane et al, Wear, 306 (2013),149-160.
Z. Mane et al, Wear, 306 (2013),161-169.

*Primary Examiner* — Nimeshkumar D Patel
*Assistant Examiner* — Jean F Morello
(74) *Attorney, Agent, or Firm* — Osha Bergman Watanabe & Burton LLP (57) ABSTRACT

The present invention provides a device and method for testing wear and friction properties of different materials under various experimental conditions representative of real usage conditions. In general, the device according to the invention is based on contacting a sample with a rotating disk with intermittent contact, in "open cycle" conditions, where dynamic loads are applied to the sample for the contact to occur. The control of dynamic loading is fully independent of the disk rotation.

18 Claims, 7 Drawing Sheets

(51) Int. Cl.
*G01N 3/34* (2006.01)
*G01N 3/62* (2006.01)
*G01N 19/02* (2006.01)

(58) Field of Classification Search
USPC .................................................. 73/6, 7, 9
See application file for complete search history.

(56) References Cited

U.S. PATENT DOCUMENTS

| | | |
|---|---|---|
| 6,412,330 B1 | 7/2002 | Dicello |
| 8,371,182 B1 | 2/2013 | Israelachvili |
| 2002/0037681 A1 | 3/2002 | Gitis |
| 2013/0047699 A1 | 2/2013 | Albinas |
| 2018/0292465 A1* | 10/2018 | Osara ................. G01M 5/0033 |

* cited by examiner

Drawings

Figure 7 ively long run-in period prior to beginning the data collection period. After a standardized time interval of many hours or days, the test sample is removed from the apparatus and weighed to determine the rate of wear at the selected pressure and velocity as a function of the weight loss.
DEVICE FOR MEASURING RUBBER WEAR This application is a U.S. national phase entry under 35 U.S.C. § 371 of International Application No. PCT/EP2017/072440, filed on Sep. 7, 2017, which claims priority to European application EP16306165.8 filed on Sep. 14, 2016. The entire content of each of these applications is explicitly incorporated herein by reference.

TECHNICAL FIELD

The present invention relates to wear and friction testing, and particularly to a new device and method for friction and wear measurements of rubber materials under various experimental conditions representative of real usage conditions.

BACKGROUND ART

Tribology is the science of the interaction of surfaces in relative motion. It includes the study of friction and wear. A tribometer is used to measure the performance of materials relating to friction and wear when tested under different conditions, including pressure and velocity over time.

Known in the art is a technique that involves the use of a test apparatus in which a friction surface moving at a selected velocity, either with rotational or linear travel, is contacted by a non-movable test sample while applying continuous controlled pressure to the test sample on the friction surface. The test method requires a relatively long run-in period prior to beginning the data collection period. After a standardized time interval of many hours or days, the test sample is removed from the apparatus and weighed to determine the rate of wear at the selected pressure and velocity as a function of the weight loss.

Alternatively, the wear measurement can be made by dynamic measuring systems such as those proposed in WO01/61315 and in U.S. Pat. No. 4,966,030, wherein parameters related to the wear of the samples are measured without the need of removing and weighing the sample, by means of sensors mounted on the support on which the sample is placed.

In WO01/61315 a force measurement device is present in the apparatus, which measures the force at the footprint of the sample, thus giving a signal indicative of the friction characteristics (e.g. coefficient of friction) of the sample being tested for the selected surface.

In U.S. Pat. No. 4,966,030 a proximity sensor is attached to the supporting structure of the test sample and moves with the test sample itself. The proximity sensor faces the friction surface disk and measures the change in distance between the supporting structure and the friction surface disk. When a test is run pressure is applied to the test sample and the friction surface disk is rotated at a set velocity to give the desired pressure and velocity over time. The gap between the supporting structure and the test sample from the beginning of the test to the end of the test indicates the amount of material lost during the test and gives the amount of wear achieved under the specific conditions.

US2002/0037681 discloses an apparatus for performing and controlling a polishing process which comprises a rotating platen with a pad, a rotating head that supports an object to be treated, e.g., a semiconductor wafer, and performs radial movements with respect to the platen, and a polishing process control system comprising a plurality of sensing devices for detecting an end point of the process. The sensing device can be either a group of high-frequency acoustic emission sensors built into components of the rotating head and/or force/torque sensors connected with various elements of the rotating head and the platen. In the first case the apparatus measures high-frequency acoustic emission signals corresponding to changes that occur in the interface between the object and the pad. In the second case variations in the coefficient of friction between the object to be treated and the pad are detected in order to determine the end point of the polishing process.

Known in the art is also a technique making use of a device comprising a movable friction surface that is contacted by a friction element bearing the sample, wherein the load of the sample on the friction surface can be varied during the test with a certain frequency.

US2013/0047699 discloses a device comprising a friction pair of a moveable friction element and a pressed friction element, and a clamp for applying controlled force on the friction pair using a first force sensor. The device is used for measuring the influence of high friction loads on wear characteristics of surface material. A shift sensor mounted on the holder on which the sample is supported measures the shift of the holder due to wear of sample on the friction element.

Z. Mane et al, Wear, 306 (2013), 149-169, disclose a rotary tribometer developed to reproduce abrasion wear at the interface between the reinforced material of a tire and the road surface, under controlled environmental conditions. The intermittent contact between the road surface and the tire tread is represented by a polished stainless steel sphere which rubs onto a thin plate of the reinforced rubber material glued on a rotating disk. The rotation speed of the disk during the sliding passage on the sample, the time between two passages and the number of revolutions are controlled. An optical laser device placed on the shaft holding the rubbing sphere gives information on the wear surface topography, type of wear pattern and their dimension. The tribometer thus allows measuring the evolution of the friction coefficient and the weight loss as a function of the number of passages. However, the tests carried out using this type of tribometer are time consuming.

Testing friction and wear with tribometers of the prior art, involving either continuous or intermittent contact between the sample and the friction surface, requires long times and becomes a bottleneck in the development of new rubber materials. Test durations are often in the 50 to 4.000-hours range. Wear measurements are obtained either by analysing the sample removed from the device or by dynamic measuring systems placed on the device, close to the sample.

There is the need for an improved device for a faster measurement of wear and friction properties of several samples when contacted with friction surfaces of different materials and/or surface roughness, in laboratory conditions which are close to real usage conditions in terms of kinematics of the contact, frequency and temperature, including low severity conditions.

There is also the need for a device that allows performing tests with enlarged ranges of sliding velocities and with an independent control of the variation of the sliding velocity and of the dynamical contact characteristics during the test.

There is further the need for a device with an improved dynamic measure system of the wear and friction parameters in situ.

SUMMARY OF INVENTION

The present invention provides a device and method for improved, accelerated and quantitative friction and wear measurements of samples of different materials under various experimental conditions representative of real usage conditions.

It is therefore an object of the invention to provide a device and method for a fast testing of friction and wear properties of samples of various materials under contact with different friction surfaces.

The device and method are particularly suited for measuring the friction and wear properties of series of samples when contacted with different friction surfaces under various experimental conditions representative of real usage conditions.

More particularly, the device and method are suited for measuring the friction coefficient between elastomer samples, such as tire treads, and different friction surfaces at various sliding velocities and loading conditions.

In general, the device according to the invention is based on contacting a sample with a rotating disk with intermittent contact, in "open cycle" conditions, where dynamic loads are applied to the sample for the contact to occur.

In the present specification the expression "open cycle" is used to refer to working conditions during the test where the contact zone between the sample and the rotating disk is free from abrasion wastes since worn debris are eliminated from the contact zone during the test.

The device is configured for easy and quick changing of friction surfaces of any nature and roughness.

The motion of the rotating disk and that of the sample are controlled in a fully independent way, which allows changing separately and independently the sliding velocity, the dynamic loading conditions and the contact time between the sample and the friction surface of the rotating disk.

The independent kinematic control of the sliding velocity and of the contact time between the sample and the friction surface allows the evaluation of the relationship between wear and the viscoelastic properties of the samples of different materials. This evaluation is not possible with the tribometers of the prior art either because they only provide for continuous contact, or because the tests of the prior art are based on a rotating wheel or sample, in which both the sliding velocity and the frequency of contact are determined by the rotation speed of the sample with respect to the friction surface.

The rotating disk is fixed to a vertical shaft driven by a first motor.

The friction surface can be removably supported on the rotating disk or it may represent the surface of the rotating disk itself. The friction surface can be easily interchanged with other friction elements of different materials and/or roughness, as may be desired for testing a particular sample on different friction surfaces and/or in different test conditions.

A second, independent, motor provides for the horizontal displacement of the sample. Horizontal displacement is used to position the sample on the rotating disk at a given distance from the vertical shaft axis driving the rotating disk (i.e. at a given radius). The horizontal displacement can be changed in real time during the test, so that fresh contact area on the rotating disk can be used. This ensures that friction and/or wear tests are performed in true "open cycle" conditions.

The sample is fixed to a movable part which provides for vertical movement, substantially perpendicular to the friction surface, and allows the contact with the friction surface by dynamic modulation of normal load and fully independent control of contact time, frequency of contact and sliding velocity. The vertical movement is provided by a third independent motor.

Sample deformation and wear are measured in-situ in real time with a high resolution camera.

The camera positioning is independent from the vertical movement of the sample, to allow accurate measurements of the position of the sample and flexibility of instrumentation.

The device can be enclosed in a temperature controlled enclosure to simulate different temperature conditions and environmental conditions (e.g. humidity ratio).

In a preferred embodiment of the invention, a processor controls all the operations, parameter settings and data acquisition.

DESCRIPTION OF EMBODIMENTS

A first object of the present invention is a device for testing wear and friction properties of materials comprising:
  a rotating disk (5) fixed to a vertical shaft (6) driven by a first motor (16),
  a friction surface (17) provided on the rotating disk (5),
  a sample holder (10) for holding a sample surface in contact with the friction surface (17),
  means for providing for intermittent engagement of a sample surface with the friction surface and for measuring the forces applied during said intermittent engagement, said means comprising a dynamic actuator (14) and a three axes load cell (2) connected with the sample holder (10),
  a camera (4) independent from the movement of the sample holder for detecting wear,
  wherein
  the dynamic actuator (14), the sample holder and the three axis load cell are mounted on a drive system providing for horizontal and vertical displacement with respect to the rotating disk, said system comprising a mechanical support (8) driven horizontally by a second motor (13) and a vertical support (1) mounted onto said mechanical support (8) for movement therewith, which is driven vertically by a third motor (12), and wherein first motor (16), second motor (13) and third motor (12) are driven independently one of the other.

Figure 1:
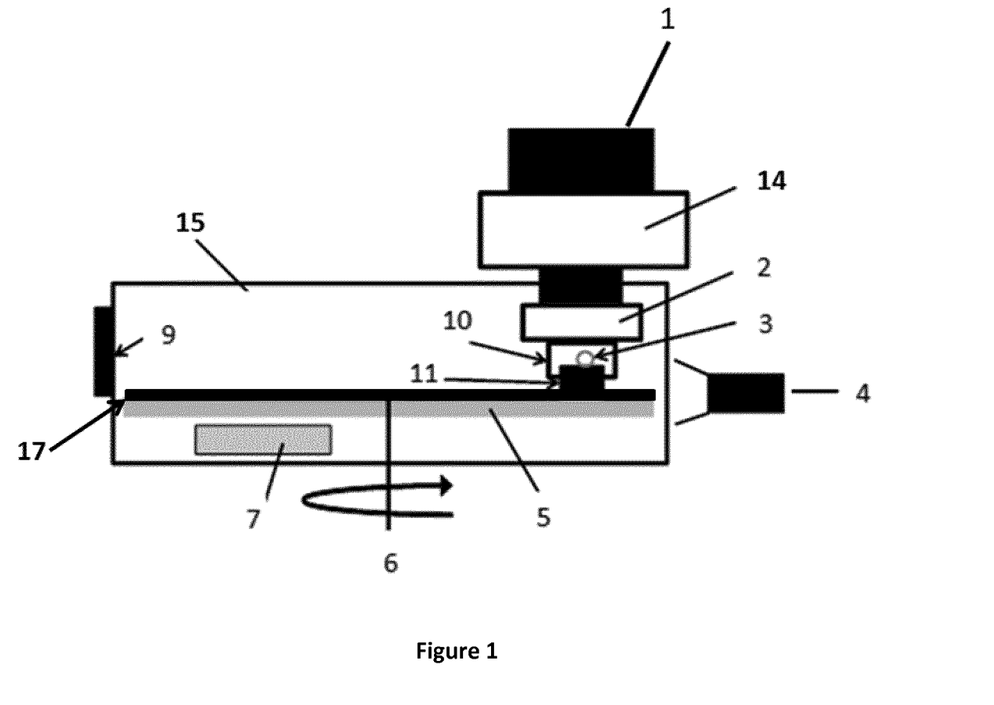
FIG. 1 is a schematic side view of the device according to the present invention.
Figure 2:
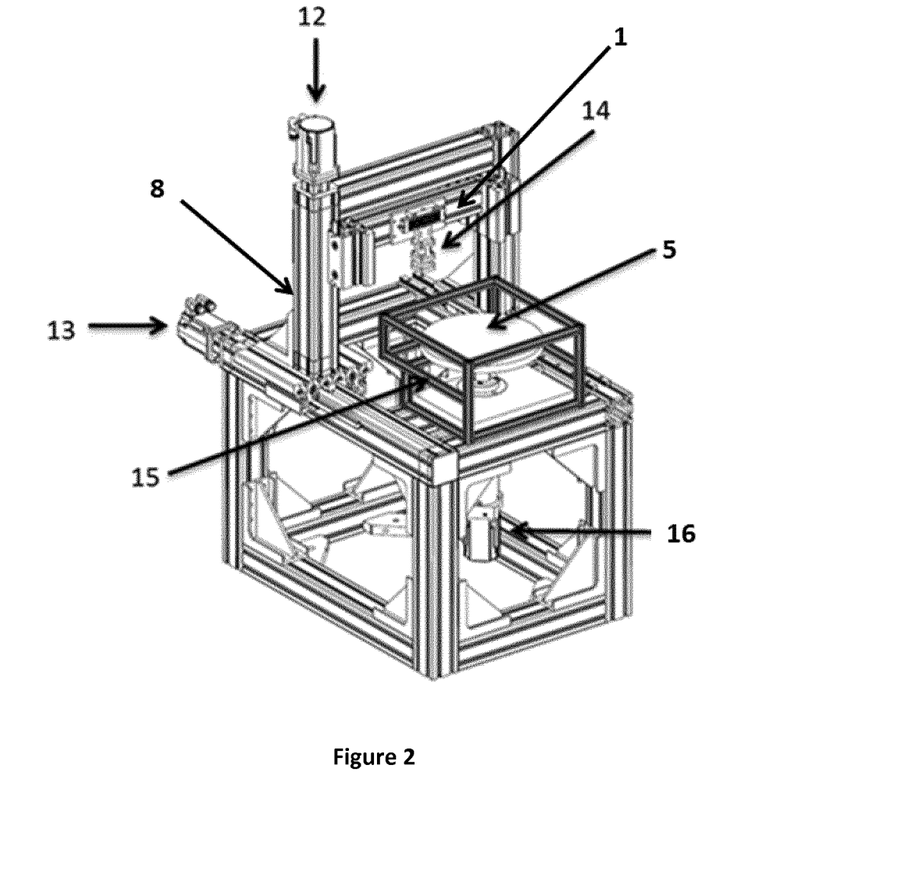
FIG. 2 is a general scheme of the various parts of the device according to the present invention.
Figure 3:
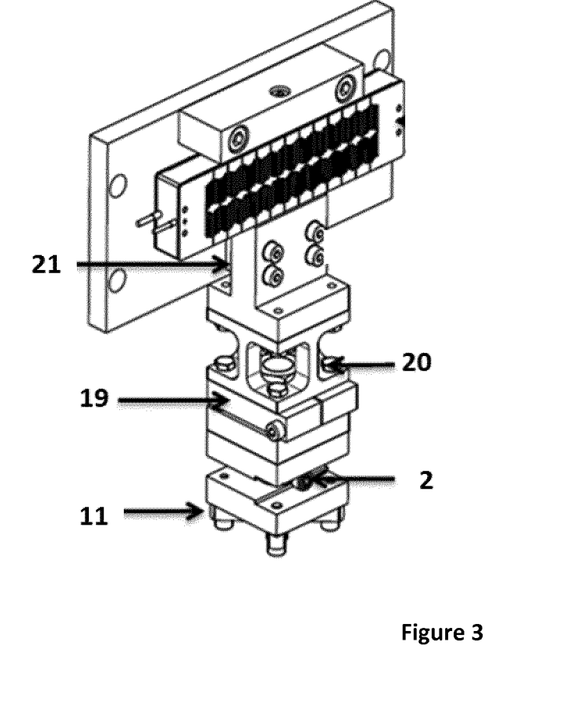
FIG. 3 is a general scheme of the dynamic actuator (14).

Referring now in details to FIGS. 1 to 3, the device of the present invention comprises a rotating disk (5) fixed to a vertical shaft (6) driven by a first motor (16). The rotating disk can easily be removed by lifting it out of the shaft.

The independent motion of the rotating disk along shaft (6) driven by the first motor (16) provides for a large range of sliding velocities.

The preferred sliding velocity is comparable to what a tire experiences in service, and it is more preferably varied from 0.001 to 1 m/s, typically from 0.005 to 0.50 m/s preferably from 0.01 to 0.10 m/s.

A speed reduction gear box is mounted on the shaft to obtain a large enough torque, so that rotating speed is not affected by the friction during contacts of the sample.

Rotating disks having different thickness and diameter can be used. The rotating disk may have a thickness of from 1.0 to 5.0 cm, typically of from 1.0 to 4.0 cm. The rotating disk may have a diameter of from 15 to 50 cm, typically of 15 to 45 cm, preferably of from 20 to 40 cm.

In a preferred embodiment, a rotating disk with a thickness of 1.0 to 3.0 cm and a diameter of 25 to 35 cm is used. Good results have been obtained with a rotating disk with a thickness of 2.0 cm and a diameter of 30 cm.

A rotating disk with a friction surface of any nature and roughness can be used. The friction surface (17) may be any one of a variety of different surfaces. Preferably, the friction surface is made of polished stain steel, granite, glass or sand paper.

The friction surface may have different textures, for example rough, smooth, grooved, etc. The friction surface texture can be tuned depending on the desired test conditions or test severity.

The friction surface can be removably supported on the rotating disk or representing the surface of the rotating disk itself. The friction surface can be easily interchanged with other friction elements of different materials and/or roughness, as may be desired for testing a particular sample on different friction surfaces and/or in different test conditions. Interchanging the surfaces can be achieved by substituting the friction surface supported on the rotating disk or by substituting the whole rotating disk by lifting it out of the shaft (6) and substituting it with a rotating disk bearing a different friction surface.

The device comprises a mechanical support (8), which is driven horizontally by a second motor (13).

The mechanical support (8) has mounted thereon a vertical support (1) which moves therewith and is also driven vertically by a third motor (12). The vertical support carries a dynamic actuator (14), a three axes load cell (2) and a sample holder (10) attached to the lower end.

Motion of the vertical support is constrained to be strictly vertical with a vertical guidance rail (21).

The regulation of the static sample horizontal and vertical displacements is assured by the movement of the second motor (13) and of the third motor (12), respectively. This ensures that the sample is held in its proper location against the friction surface (17) supported on the rotating disk.

The regulation of the vertical displacements of the sample determines the normal load (normal force $F_N$) applied to the sample.

The normal force applied to the sample may be in the range of from 1 to 100 N, preferably in the range from 10 to 50 N, more preferably from 20 to 40 N. Still more preferably, the normal force is of 40 N.

The second motor (13) provides for the horizontal displacement of the mechanical support and thus of the sample. Horizontal displacement is used to position the sample at a given distance from the shaft (6) axis of the rotating disk (i.e. at a given radius). The horizontal displacement can be varied in real time during the test, thus providing for a contact of the sample with unused parts of the disk friction surface. This ensures that friction and/or wear tests are performed in true "open cycle" conditions.

The first motor (16), the second motor (13) and the third motor (12) are driven independently one from the other. They are powered through power regulators and/or variators.

A dynamic actuator (14) controls the vertical dynamical displacement of the sample onto the friction surface, being configured to provide for the intermittent engagement of the sample with the friction surface supported on the rotating disk, assuring a fully independent control of contact time, frequency of contacts and sliding velocity.

Preferred dynamic actuator (14) is a large amplitude actuator, with amplitude in the order of 1 mm, which allows maximum loading of up to 100 N, with very short response time, in the milliseconds (ms) range. Preferably, the dynamic actuator is a piezo-electric actuator.

The three axis load cell (2), located on top of the sample holder, measures the forces applied onto the sample over the three axes, giving the values of normal and tangential loadings of the sample over the friction surface in real time. The time resolution of the three axis cell is in the order of 1 kHz.

The output of the load cell is connected to a data acquisition system.

In a preferred embodiment, a spacer (20) is placed in between the dynamic actuator (14) and the sample holder (10).

The sample holder (10) can be of any suitable geometric shape, cylindrical shape being preferred.

A temperature measurement device (3) is placed in contact with the sample holder in order to measure the actual sample temperature during the test.

An alignment device (19) mounted on the vertical support (1) ensures to arrange the sample surface and the friction surface in parallel arrangement, or so that a fixed angle is formed between them. Preferably, the alignment device is made of a clamped spherical fixture.

The angle between the sample surface and the friction surface may advantageously be comprised between 0 and ±10°, typically between 0 and ±5°.

The sample deformation is measured in-situ with a camera (4), by real-time absolute measurements of the distance between the sample and the friction surface.

The camera is placed in horizontal position onto the device and independent from the movement of the sample. It is maintained at a constant distance to the sample.

The camera may be an optical or digital camera. The camera is preferably a high resolution digital optical In a preferred embodiment, the camera is mounted on the mechanical support (8), for movement therewith.

The camera allows high resolution visualization of the sample throughout the test and dynamical, real time recording of the sample deformation during each contact.

The thickness of the sample submitted to wear is measured in real time during the wear test with micrometer accuracy. Any drift of the measured vertical displacement at a fixed force level is related to the change in the thickness of the sample, that is, to the amount of matter lost during the test, which can then be expressed in terms of weight loss. Thus, advantageously the inventive device allows determining the wear, i.e. weight loss, of the sample in-situ without the need to remove the sample from the device and determine its weight. The wear of the sample can be monitored throughout the performance test.

In a preferred embodiment, a light source (9) is placed in background, behind the sample, in front of the camera, to create high contrast for optical visualization.

The optical camera may also be used to determine the exact vertical sample position, and to adjust the vertical position of the sample close to the disk surface.

The device can be enclosed in a temperature controlled chamber to simulate different temperature and environmental conditions (e.g. humidity ratio), such as winter and summer conditions, and to evaluate the effects of temperature variations on the sample.

The temperature surrounding the device can be regulated in the range comprised between 0 and 80° C., preferably in the range comprised between 20 and 60° C., by means of a suitable heating and/or cooling unit (7).

In a preferred embodiment of the invention, the device includes a temperature control chamber (15) enclosing at least the friction surface and the sample holder, when the device is not in use, and the sample holder and the sample, when the device is in use. In a further preferred embodiment, the temperature control chamber further encloses the heating and/or cooling unit (7).

The top wall of the chamber can be opened by means of a handle. This enables easy and quick interchanging of samples, rotating disks and friction surfaces.

The device includes an appropriate way to clean the friction surface, that is, to eliminate wear debris from the friction surface.

In a preferred embodiment of the invention, a processor controls all the operations, parameter settings and data acquisition: static sample horizontal and vertical displacements; disk rotation; control of the normal load; signal triggering; control of the dynamical displacement; data acquisition.

The processor further analyses the data and provides a readout of the results, preferably in the form of tables and/or graphs.

A second object of the present invention is an assembly comprising the aforesaid device and a sample (11) of a material. The sample is placed in the sample holder (10). Sample (11) is attached to the sample holder (10) so that the surface of the sample to be tested is available for contact with the friction surface (17) of the rotating disk (5).

The sample (11) can be of any geometrical shape which fits in the sample holder. Preferably, the sample is in the form of a cylinder, a hemisphere or a sheet.

The sample (11) is removably attached to the sample holder by suitable means.

Preferably, the thickness of the sample is of from 1 to 5 mm, more preferably it is of about 2 mm.

In a preferred embodiment, the sample is an elastomer sample of cylindrical shape having diameter in the range comprised between 5 and 10 mm and thickness of about 2 mm.

In another preferred embodiment, an elastomer sample has a hemispherical shape of preferred radius between 5 and 10 cm.

In another preferred embodiment, the sample is a sheet of elastomer of thickness 2 mm. In this preferred embodiment the sheet of elastomer is adjusted on a cylinder with axis parallel to the friction surface of preferred radius between 5 and 10 cm, said cylinder being then removably attached to the sample holder.

In the present specification, the term elastomer is used in the meaning provided by IUPAC to indicate a "polymer that displays rubber-like elasticity", that is a polymer which readily undergoes deformation and exhibits large reversible elongations under small applied stress. Elastomer (E) preferably exhibits at least one glass transition temperature (Tg), measured by differential scanning calorimetry (DSC) of between −150° C. and +300° C., for example between −150° C. and +20° C.

A further object of the present invention consists in providing a method of testing wear and friction properties of a sample by using the aforesaid device.

The method comprises the steps of: preparing a sample (11); attaching the sample to the sample holder (10); selecting the rotating disk (5) or the friction surface (17) to be supported onto the rotating disk (5); activating the first motor (16) for setting the disk rotation speed; activating the second motor (13) and the third motor (12) to set the horizontal and vertical position of the sample (11) on the friction surface (17); activating the dynamic actuator (14) to apply the normal load (normal force) onto the sample and to provide intermittent engagement of sample (11) with friction surface (17); and recording the outputs of the three axis load cell (2) and of the camera (4) for the evaluation of parameters related to wear and friction properties of samples.

The method includes in-situ measurements of the sample thickness by performing force vs displacement curves in static indentation (no sliding velocity, by suppressing temporarily the disk rotation) at chosen intervals during the wear tests, wherein the normal force variation is measured by the three axis load sensor and the displacement is measured with the high resolution camera.

The duration of the test is comprised between 1 and 20 hours, preferably between 1 and 10 hours, more preferably between 2 and 5 hours.

In a preferred embodiment, the method of the present invention further comprises the step of replacing the friction surface with another different friction surface to predict sample characteristics with respect to different surfaces.

The method is preferably performed in the absence of any abrasive slurry or lubricant, or in general of any liquid, between the samples surface and the friction surface on the rotating disk.

In a preferred embodiment, the method comprises regulating the temperature in the range comprised between 0 and 80° C., preferably between 20 and 60° C.

In a preferred embodiment, the present invention provides a method for predicting tire wear and friction properties of a tread component.

At each contact of the sample with the surface of the friction surface the outputs of the camera, of the three axis load cell and of the temperature sensor are acquired. In particular the following parameters are measured and acquired by the system:
the sample thickness,
the sample displacement over three axes,
the forces over the three axes, and
the sample temperature.

The outputs are connected to a data acquisition system for the evaluation of several parameters related to wear and friction properties of samples:
tangential load as a function of normal load in real time: $F_T=f(F_N)$;
time evolution of normal and tangential loads and friction coefficient: $\mu=f(t)$;
displacement, normal and tangential forces during one contact.

At chosen intervals during the wear tests, normal force vs displacement curves in static indentation (no sliding velocity, by suppressing temporarily the disk rotation) are recorded: the normal force variation is measured by the three axis load sensor and the displacement is measured with the high resolution camera.

The shift of the force vs displacement curves along a test is then evaluated, which is directly related to the change in thickness of the sample, that is, to the loss of matter, which can then be expressed in terms of weight loss.

Wear measurement are expressed as weight loss per unit slipping length per unit area of contact, computed as w=hAd/1000, where w is the weight loss value (in mg), h is the average vertical change (change in thickness of the sample, in μm), A is the contact surface area (in mm$^2$) and d is the density of the material (in g/cm$^3$).

Thus, advantageously the inventive method allows determining the wear, i.e. weight loss, of the sample in-situ without the need to remove the sample from the device and determine its weight.

Slipping length per contact is defined as the sliding velocity (given by the rotation speed of the disk multiplied by the distance between the sample and the axis of the rotating disk) multiplied by the sliding contact duration.

Contact area is preferably between 10 and 100 mm$^2$.

The friction coefficient is calculated as the ratio of the tangential load $F_T$ over the normal load $F_N$.

The advantages offered by the proposed method of testing wear and friction properties of a sample when contacted with a friction surface include, among others, the short duration of the test and the possibility of evaluating wear and friction properties under different temperature conditions. The independent movement of motors for sample displacement and rotating disk advantageously allows changing separately and independently the sliding velocity, the dynamic loading conditions and the contact time between the sample and the friction surface. This allows easily evaluating the wear in different severity conditions.

Moreover, the easy interchanging of friction surfaces and of samples allows the fast evaluation of the wear and friction properties of series of samples contacted to different friction surface.

The term "independent" is used to refer to a motor which is not in mechanical connection with other motors, and can thus be driven without any relation to other motor's movements.

The term "intermittent engagement" as used herein refers to the contact between the sample and the friction surface which occurs discontinuously over time, with a specific frequency and duration of contact.

The work leading to this invention has received funding from the European Union Seventh Framework Programme ([FP7/2007-2013] under grant agreement no 314463.

Should the disclosure of any patents, patent applications, and publications which are incorporated herein by reference conflict with the description of the present application to the extent that it may render a term unclear, the present description shall take precedence.

The following examples illustrate the invention without, however, limiting the scope thereof.

EXAMPLES

Example 1

Two rubber compositions (A and B) were prepared in a 10.380 liter Haake like internal mixer and vulcanized at 150° C. The composition of samples A and B, expressed as parts by weight per 100 parts of elastomers (phr), is shown in Table I below.

TABLE I

| Composition | A | B |
| --- | --- | --- |
| NR (1) | 100 | 100 |
| Silica (2) | — | 55 |
| Carbon black (3) | 50 | — |
| Coupling agent (4) | | 4.4 |
| Antioxidant (5) | 1.5 | 1.5 |
| Antioxidant (6) | 1 | 1 |
| Carbon black (7) | 3 | 3 |
| ZnO | 3 | 3 |
| Stearic acid | 2.5 | 2.5 |
| CBS (8) | 0.8 | 1.9 |
| Sulfur | 1.5 | 1.5 |
| Accelerator (9) | 0.2 | 0.2 |

(1) Natural Rubber SVR CV 60, available from Weber&Schaer;
(2) Silica Zeosil ®1165 MP from Solvay with specific surface BET of 156 m$^2$/g and CTAB of 154 m$^2$/g;
(3) Carbon Black N121, from available Orion;
(4) bis [3-triethoxysilylpropyl] tetrasulfane, commercially available as LUXOMAXX TESPT from Lehmann&Voss&Co;
(5) N-(1,3-Dimethylbutyl)-N-phenyl-para-phenylenediamine, commercially available as Vulkanox 4020/LG 6-PPD from Lanxess;
(6) 2,2,4-trimethyl 1,2-dihydroquinoline, commercially available as Acétonanile TMQ from SMPC;
(7) Carbon Black N330, available from Orion;
(8) CBS N-cyclohexyl-2-benzothiazyl-sulfénamide, commercially available as Rhénogran CBS-80 from RheinChemie;
(9) TBzTD tetrabenzylthiuram disulfide, commercially available as Rhenogran TBzTD-70 from RheinChemie.

Cylindrical shape samples of 10 mm and 18 mm in diameter and 2 mm thick were prepared, respectively, from compositions A and B.

Samples A and B exhibit similar Shore A hardness, as calculated according to ISO norm ASTM D 2240. The values given after 3 s are of 68 for Sample A and of 67 for Sample B.

Samples A and B were tested in the device of the invention set as in Table II:

TABLE II

| Control parameter | Notation and value |
| --- | --- |
| Sliding velocity (V) | V = 5 cm/s |
| Average normal load at contact (Normal force FN) | $F_N$ = 30 N |
| Estimated average pressure (p) (estimated contact | p = $F_N$/A = 0.35 MPa |
| Contact time (tc) | tc = 1 s |
| Time interval between contacts | 0.1 s |
| Temperature | 24° C. |
| Total number of disk revolutions | about 300 |
| Total number of contacts (N) | N = 3500 |
| Total test duration | about 2 hours |

A rotating disk with a friction surface of polished stainless steel was used.

Wear wastes were eliminated from the contact zone in between two successive contacts by cleaning the disk surface with cleaning tissue applied on the disk surface. Additionally, every 500 contacts, the disk was thoroughly cleaned by using a rubber eraser and the surface of the sample was washed with acetone.

Results

The change in the thickness of the samples was recorded and force vs displacement curves in static conditions, e.g. by suppressing disk rotation, were recorded at 0, 500, 1000, 1500, 2000, 2500, 3000 and 3500 number of contacts for Samples A and B.

Figure 4:
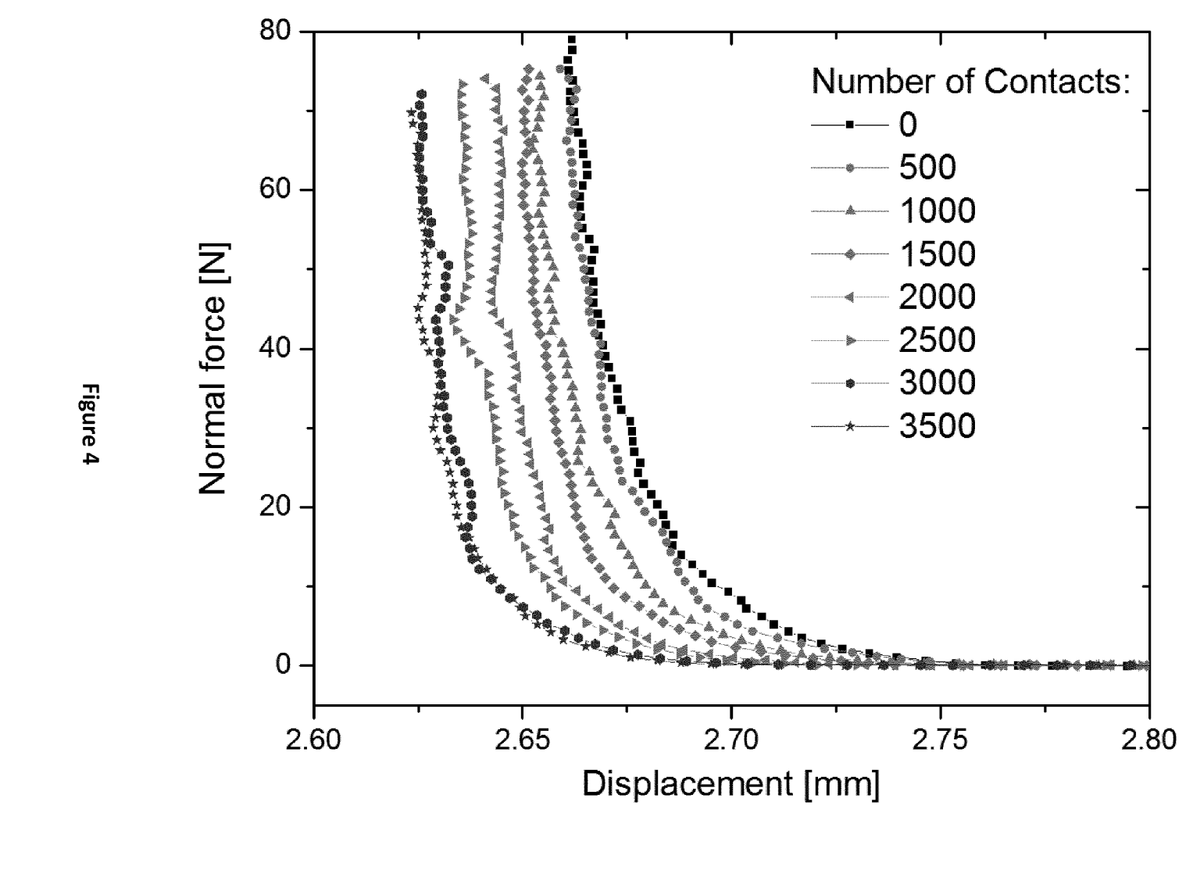
FIG. 4 shows the series of force vs displacement curves recorded successively during the wear test of Sample A.

In FIG. 4 the force vs displacement curves recorded for Sample A are reported.

The relative shift of each curve indicates and quantifies the change in sample thickness.

The shift in the force vs displacement curves is then correlated with the weight loss along wear tests.

Figure 5:
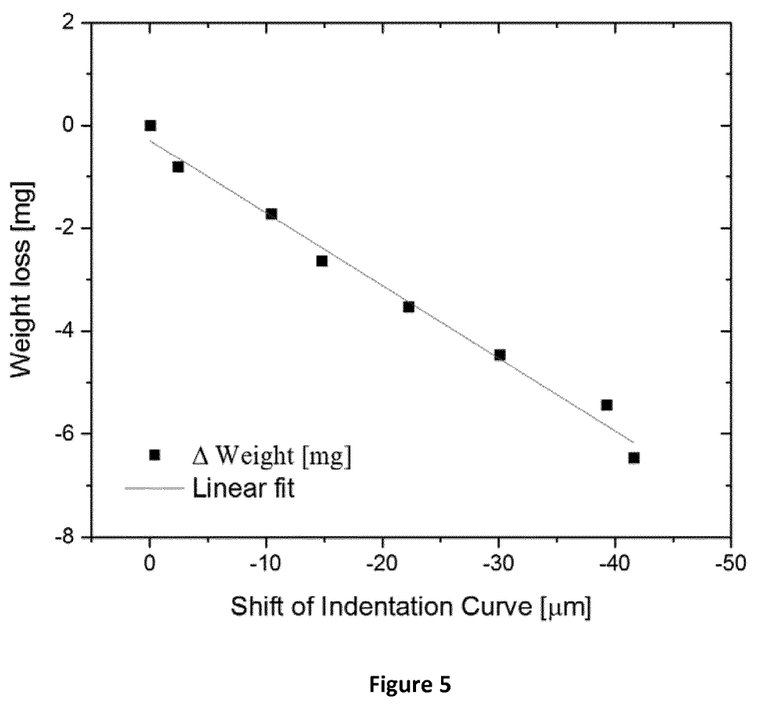
FIG. 5 shows the correlation between the shift in the force vs displacement curves (obtained from the curves of FIG. 4) and the weight loss along wear tests.

In FIG. 5 the correlation of the shift in the force vs displacement curves with the directly measured weight loss (Δ weight, mg) is reported.

Figure 6:
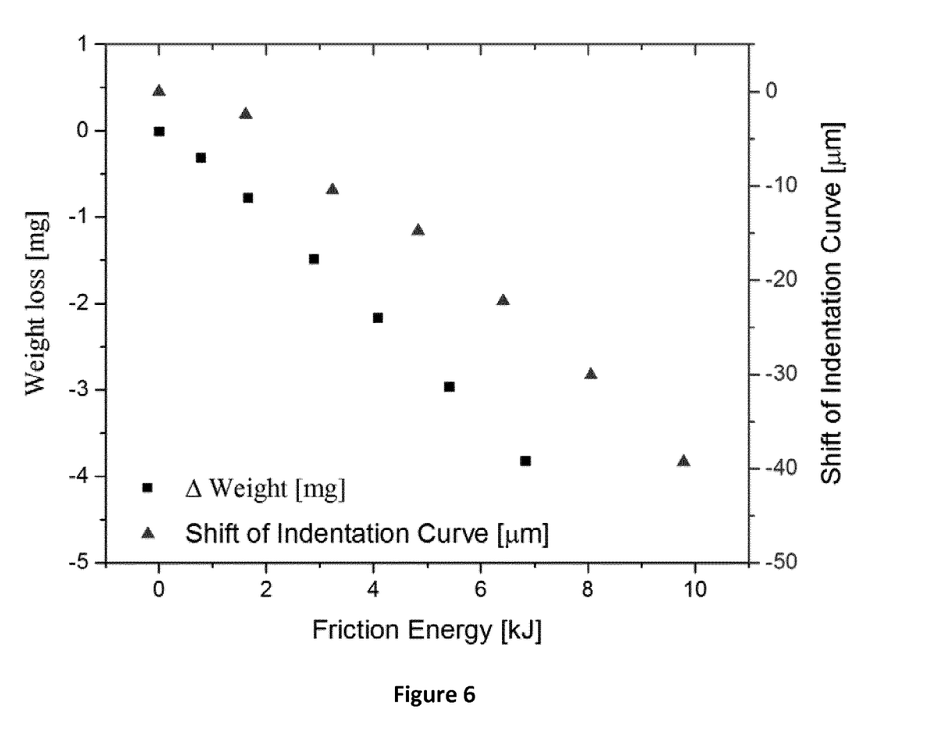
FIG. 6 show the results of the optical measurement of the change in sample thickness and the weight loss as directly measured for Sample A in example 1.

The results of the optical measurement of the change in sample thickness and the correlation to the directly measured weight loss as are reported in FIG. 6 for Sample A.

Figure 7:
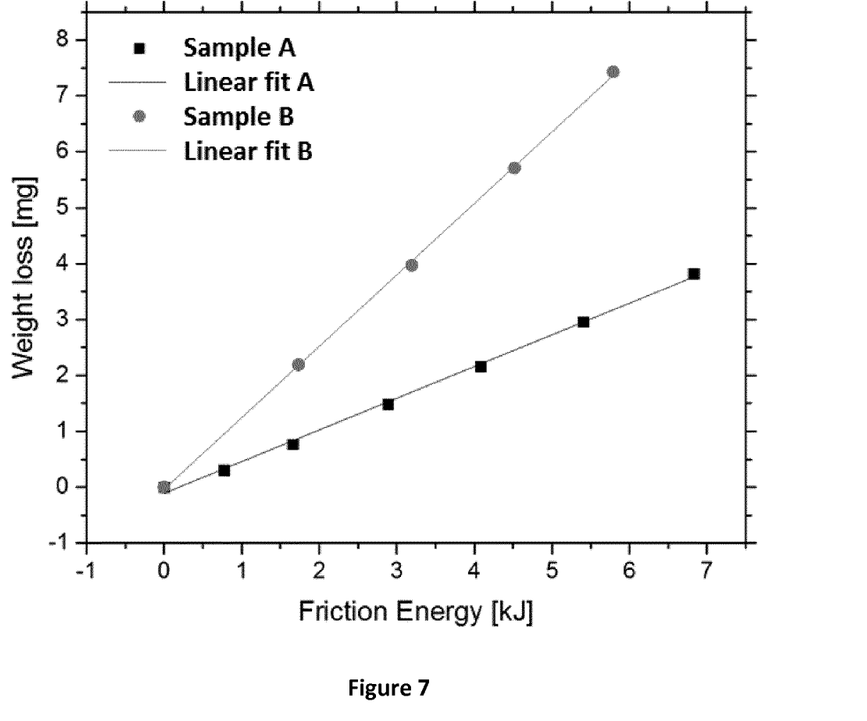
FIG. 7 shows the results in the wear detection as evaluated according to example 1 for Sample A and Sample B.

The wear performance of different samples can be discriminated as shown in FIG. 7.

The results demonstrate the reliability of the wear measurement method of the invention, which gives computed values of weight loss that reflects those obtained by direct weight loss measurements.

The device according to the invention achieves advantages in enabling a quick and reliable evaluation of wear and friction coefficient without the need for direct and time-consuming weight measurements.

The invention claimed is:

1. A device for testing wear and friction properties of materials comprising:
   a rotating disk fixed to a vertical shaft driven by a first motor,
   a friction surface provided on the rotating disk,
   a sample holder for holding a sample surface in contact with the friction surface,
   means for providing for intermittent engagement of the sample surface with the friction surface and for measuring the forces applied during said intermittent engagement, said means comprising a dynamic actuator and a three axes load cell connected with the sample holder,
   a camera independent from the movement of the sample holder for detecting wear; and
   a data acquisition system in communication with the camera and the three axis load cell, wherein a sample thickness measured from at least one camera output and the measured forces applied during intermittent engagement are recorded in the data acquisition system,
   wherein the dynamic actuator, the sample holder and the three axis load cell are mounted on a drive system providing for horizontal and vertical displacement with respect to the rotating disk, said drive system comprising:
      a mechanical support driven horizontally by a second motor; and
      a vertical support mounted onto said mechanical support for movement therewith, which is driven vertically by a third motor, and
      wherein the first motor, the second motor and the third motor are driven independently one of the other.

2. The device according to claim 1 wherein the angle between the sample surface and the friction surface is comprised between 0 and ±10°.

3. The device according to claim 1 wherein the friction surface is selected from the group consisting of polished stain steel, granite, glass and sand paper.

4. The device according to claim 1 wherein the dynamic actuator is a piezo-electric actuator.

5. The device according to claim 1 wherein the camera is mounted on the mechanical support.

6. The device according to claim 1 further including a heating and/or cooling unit for regulating the temperature surrounding the device in the range comprised between 0 and 80° C.

7. The device according to claim 6 further including a temperature control chamber enclosing at least the friction surface, the sample holder and the heating and/or cooling unit.

8. The device according to claim 1 further including a temperature measurement device placed in contact with the sample holder, wherein the data acquisition system is in communication with the temperature measurement device, and wherein a sample temperature from the temperature measurement device is recorded in the data acquisition system.

9. An assembly comprising the device of claim 1 and a sample attached to the sample holder.

10. The assembly according to claim 9 wherein the sample is in the form of a cylinder, a hemisphere or a sheet.

11. The device according to claim 2 wherein the angle between the sample surface and the friction surface is comprised between 0 and ±5°.

12. The device according to claim 1 further including:
   a heating and/or cooling unit for regulating the temperature surrounding the device in the range comprised between 0 and 80° C.;
   a temperature control chamber enclosing at least the friction surface, the sample holder and the heating and/or cooling unit; and
   a temperature measurement device placed in contact with the sample holder.

13. The device according to claim 12 wherein the friction surface is selected from the group consisting of polished stain steel, granite, glass and sand paper and wherein the dynamic actuator is a piezo-electric actuator.

14. A method of testing wear and friction properties of a sample, said method comprising the steps of:
   attaching the sample to a sample holder;
   providing a rotating disk having a friction surface on a vertical shaft driven by a first motor;
   activating the first motor to rotate the rotating disk at a disk rotation speed;
   activating a second motor to drive the sample holder horizontally to a horizontal position relative to the friction surface;
   activating a third motor to drive the sample holder vertically to a vertical position relative to the friction surface;
   activating a dynamic actuator to apply a normal load onto the sample and to provide for intermittent engagement of the sample with the friction surface;
   using a three axes load cell connected to the sample holder to measure forces applied during the intermittent engagement;
   at chosen intervals, stopping the rotation of the rotating disk, using a camera to take a picture of the sample, and measuring a vertical displacement of the sample at a fixed normal force;
   generating a normal force versus displacement curve of the sample using the normal force measured by the three axes load cell and the horizontal displacement measured with the camera at the chosen intervals;
   using changes in the normal force versus displacement curves generated from the chosen intervals to determine a change in thickness of the sample during the testing; and
   calculating weight loss of the sample based on the change in thickness of the sample during the testing.

15. The method of claim 14 wherein the test has a duration between 1 and 20 hours.

16. The method according to claim 14 further comprising regulating the temperature surrounding the device in the range from 0 to 80° C.

17. The method according to claim 14 wherein the normal force applied onto the sample is in the range of from 1 to 100 N.

18. The method according to claim 14, further comprising activating the second motor to change the horizontal displacement of the sample in real time during the test.

* * * * *